United States Patent
Dadashev

(10) Patent No.: US 7,233,192 B2
(45) Date of Patent: Jun. 19, 2007

(54) ON/OFF CHARGE PUMP

(75) Inventor: Oleg Dadashev, Hadera (IL)

(73) Assignee: Saifun Semiconductors Ltd, Netanya (IL)

(*) Notice: Subject to any disclaimer, the term of this patent is extended or adjusted under 35 U.S.C. 154(b) by 78 days.

(21) Appl. No.: 11/099,660

(22) Filed: Apr. 6, 2005

(65) Prior Publication Data
US 2006/0226890 A1 Oct. 12, 2006

(51) Int. Cl.
*H03K 3/01* (2006.01)
*G05F 1/10* (2006.01)
(52) U.S. Cl. .................................... 327/534; 327/537
(58) Field of Classification Search .............. None
See application file for complete search history.

(56) References Cited

U.S. PATENT DOCUMENTS

| | | | |
|---|---|---|---|
| 5,276,646 A | 1/1994 | Kim et al. | |
| 6,259,612 B1 * | 7/2001 | Itoh | 363/60 |
| 6,642,775 B2 * | 11/2003 | Imamiya | 327/536 |
| 2003/0169097 A1 * | 9/2003 | Henry | 327/536 |

* cited by examiner

*Primary Examiner*—Tuan T. Lam
(74) *Attorney, Agent, or Firm*—Eitan Law Group

(57) ABSTRACT

A method includes controlling the connection of a charge pump output to a load capacitor as a function of activation control signals to an oscillator controlling the charge pump. A charge pump system includes a charge pump, an oscillator, a switching element and an enable signal generator. The switching element connects and disconnects the charge pump from a load capacitor. The enable signal generator is connected to the oscillator and to the switching element and enables and disables the oscillator and the switching element as a function of the output of the charge pump.

7 Claims, 7 Drawing Sheets

ON/OFF CHARGE PUMP

FIELD OF THE INVENTION

The present invention relates generally to charge pumps for circuits and to their regulation in particular.

BACKGROUND OF THE INVENTION

Charge pumps are devices that operate as power supplies for electronic circuitry. They provide a controlled output voltage that is higher than the input voltage of the charge pump. Charge pumps are generally implemented by cascading stages that include energy injection capacitors and charge transfer elements. Four-phased multi-stage charge pumps are generally considered to be one of the most efficient pump architectures known in the art and are, accordingly, widely utilized in the art.

Energy is injected into a given stage by a driver which provides a clock signal to the input of the capacitor(s). This signal oscillates between a positive supply rail (for example, $V_{DD}$) and a negative supply rail (for example, GND). The voltage at the output of the capacitor is boosted by the voltage swing between the supply rails (for example, from GND to $V_{DD}$). The charge transfer element (often a transistor or a diode) transfers the accumulated charge to the next stage. Each charge pump stage boosts the voltage in proportion to the voltage swing of the driver such that the output of the pump is a multiple of the voltage swing.

Known prior art methods of regulating the output voltage of charge pumps have varied limitations that significantly affect the overall efficiency of the charge pump's operation.

U.S. Pat. No. 5,276,646 of Kim et al., which is incorporated herein by reference in its entirety, describes a system and method for providing a constant voltage at the output of a charge pump. The system and method taught in Kim continuously measures the output of the charge pump and enables or disables the operation of the charge pump based on the value of the measured output voltage being above or below the desired output voltage. This on/off method causes a large delay between the actual reading of the output voltage and the corrective action taken with respect to the operation of the charge pump such that a ripple effect of as high as 1 volt is introduced at the output voltage of the charge pump. Moreover, when the charge pump is turned on, large substrate noises occur.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
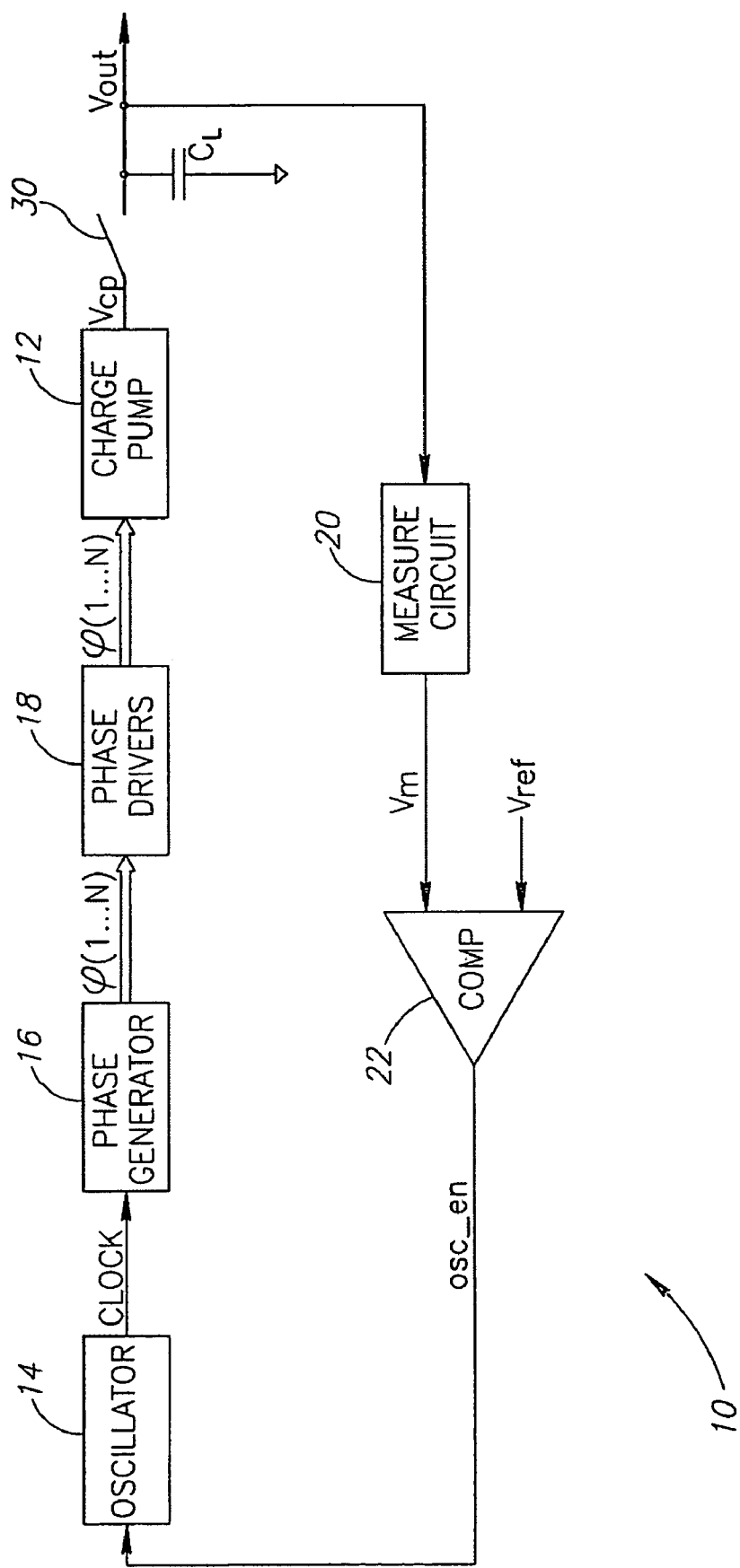
FIG. 1 is a block diagram illustration of an improved charge pump system, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1, which illustrates an improved on/off charge pump system 10, constructed and operative in accordance with the present invention. Charge pump system 10 may comprise a charge pump 12, an oscillator 14, a phase generator 16, phase driver units 18, a measure circuit 20, a load capacitor $C_L$, a comparator 22 and, in accordance with a preferred embodiment of the present invention, a switch 30 to disconnect charge pump 12 from load capacitor $C_L$.

Oscillator 14 may generate a clock signal which phase generator 16 may separate into multiple clock signals shifted in phase from each other. Two phases $\phi_1$ and $\phi_2$ are shown in FIG. 1; this is for example only and additional possibilities are included in the present invention. Driver units 18 drive phase signals $\phi$ by different amounts before they reach charge pump 12.

Charge pump 12 may generate a charge pump voltage $V_{CP}$ from phase signals $\phi$. When switch 30 may be closed, charge pump voltage $V_{CP}$ may be equivalent to an output power supply voltage $V_{out}$.

Load capacitor $C_L$ may maintain output supply $V_{out}$ and may provide sufficient power to the circuits connected to charge pump system 10. Measure circuit 20 may measure output supply level $V_{out}$, reducing it to a measured level $V_m$ close to a reference voltage $V_{ref}$ to which comparator 22 may compare it.

Comparator 22 may turn charge pump 12 on and off through an enable signal osc_en to oscillator 14, depending, respectively, on how low or high output level $V_{out}$ gets. The shutting off of oscillator 14 may propagate through charge pump system 10 and, eventually, output signal $V_{CP}$ may start to fall.

In accordance with a preferred embodiment of the present invention, switch 30 may also be controlled by enable signal osc_en. Thus, as soon as comparator 22 may disable oscillator 14, it may also disconnect charge pump 12 from load capacitor $C_L$. This disconnection may keep additional charge from being added to load capacitor $C_L$ after comparator 22 shuts off oscillator 14 but before output $V_{CP}$ begins to fall. Instead, output supply voltage $V_{out}$ may begin to decline after disconnection, as a function of the load to which it is connected. Thus, as soon as comparator 22 may determine that output supply level $V_{out}$ has risen too high, comparator 22 may stop its rise, through the disconnection of charge pump 12 from load capacitor $C_L$.

At some point, output supply voltage $V_{out}$ may decline sufficiently for comparator 22 to re-enable the enable signal osc_en. This may re-activate oscillator 14 and, in accordance with a preferred embodiment of the present invention, may also reconnect output supply voltage $V_{out}$ with charge pump output voltage $V_{CP}$. At this point, whatever voltage may exist in charge pump 12, such as may have been added after disconnection, may be provided to load capacitor $C_L$. Since there may have been little or no load on charge pump 12 during disconnection, little charge may have been lost from charge pump 12 during the disconnection period and thus, at reconnection, charge pump 12 may have a reasonable voltage level and thus, output level $V_{out}$ may quickly rise to its desired level.

Figure 2:
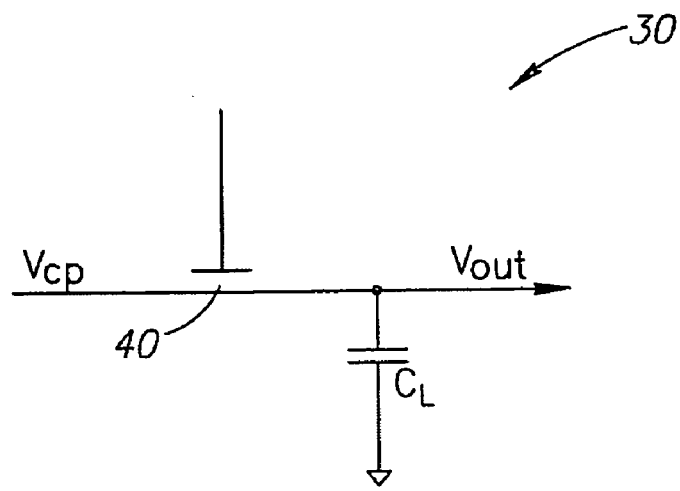
FIG. 2 is a circuit diagram illustration of a switch disconnecting a charge pump from a load capacitor forming part of the system of FIG. 1.

Switch 30 may be implemented in many ways. In one embodiment, shown in FIG. 2 to which reference is now briefly made, it may be a transistor 40 connected between charge pump output $V_{cp}$ and load capacitor $C_L$. Transistor 40 may be controlled by enable signal osc_en and thus, may transfer charge only when enable signal osc_en is ON.

Figure 3:
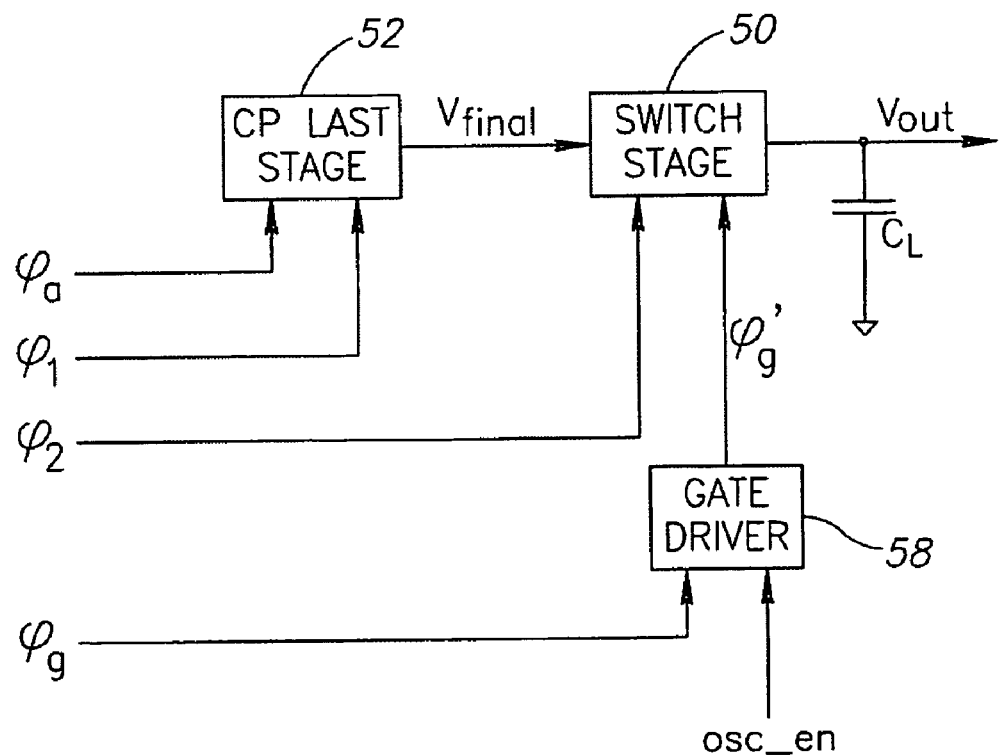
FIG. 3 is a block diagram illustration of an alternative embodiment of the switching unit of FIG. 1, utilizing a switch stage of a charge pump forming part of the system of FIG. 1.

For an alternative embodiment, shown in FIG. 3, to which reference is now made, Applicant has realized that, with little additional logic to be added, it may be possible to utilize a switch stage 50 of charge pump 12, which may control when the charge pump output may be transferred to load capacitor $C_L$, as switch 30.

FIG. 3 shows a charge pump last stage 52 which may transfer a final voltage $V_{final}$ to switch stage 50 which, in turn, may control when final voltage $V_{final}$ may be transferred to load capacitor $C_L$. In the embodiment of FIG. 3, there are four phase signals, labeled here $\phi_a$, $\phi_1$, $\phi_2$, and $\phi_g$, where $\phi_a$ and $\phi_1$ may control one set of stages including last stage 52 and $\phi_2$ and $\phi_g$ may control a second set of stages including switch stage 50.

In accordance with a preferred embodiment of the present invention, enable signal osc_en may not directly control switch stage 50. Instead, enable signal osc_en may, through a gate driver 58, control the phase signal, such as $\phi_g$, which controls the transfer of charge to load capacitor $C_L$. Thus, in this embodiment, charge may be transferred to load capacitor $C_L$ only at the appropriate moments, irrespective of when enable signal osc_en changes state.

In one embodiment, gate driver 58 may be implemented as an AND gate, such that, when enable signal osc_en is ON, phase signal $\phi_g$ may be passed. Otherwise, it may not be passed. The output of gate driver 58, which may control switch stage 50, may be an enabled phase signal $\phi_g'$.

Figure 4:
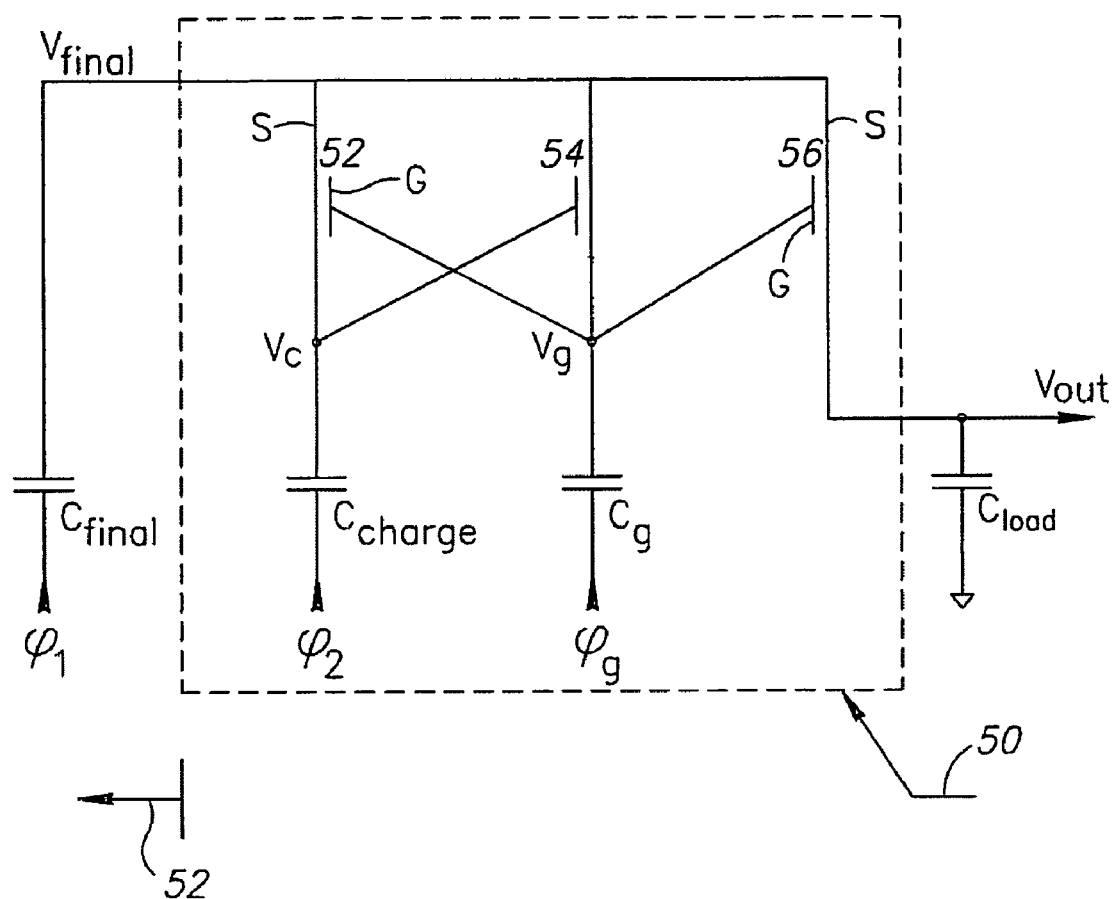
FIG. 4 is a circuit diagram illustration of the switch stage of FIG. 3.
Figure 5A:
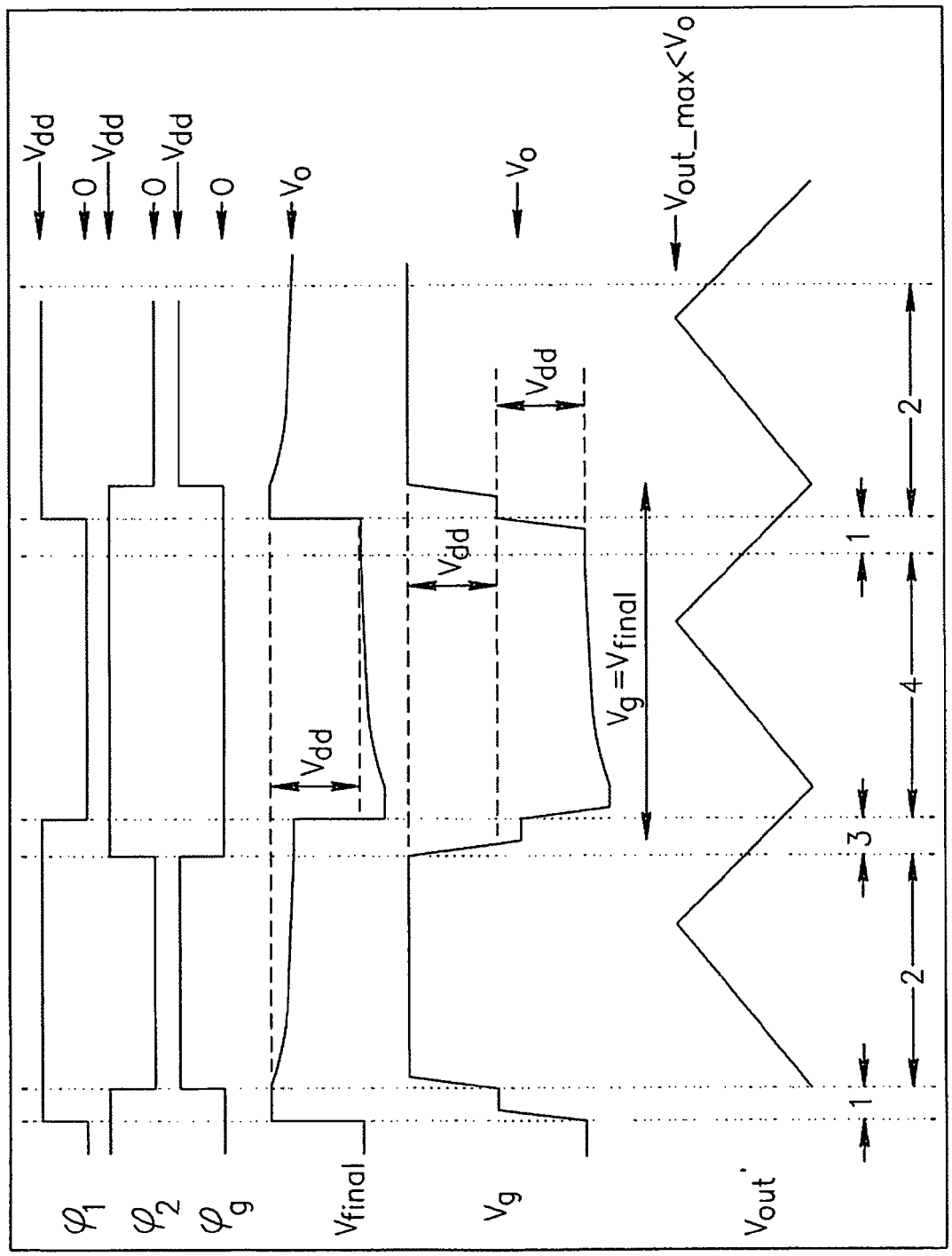
FIG. 5A is a timing diagram illustration of the operation of the switch stage of FIG. 3 in a standard mode.
Figure 5B:
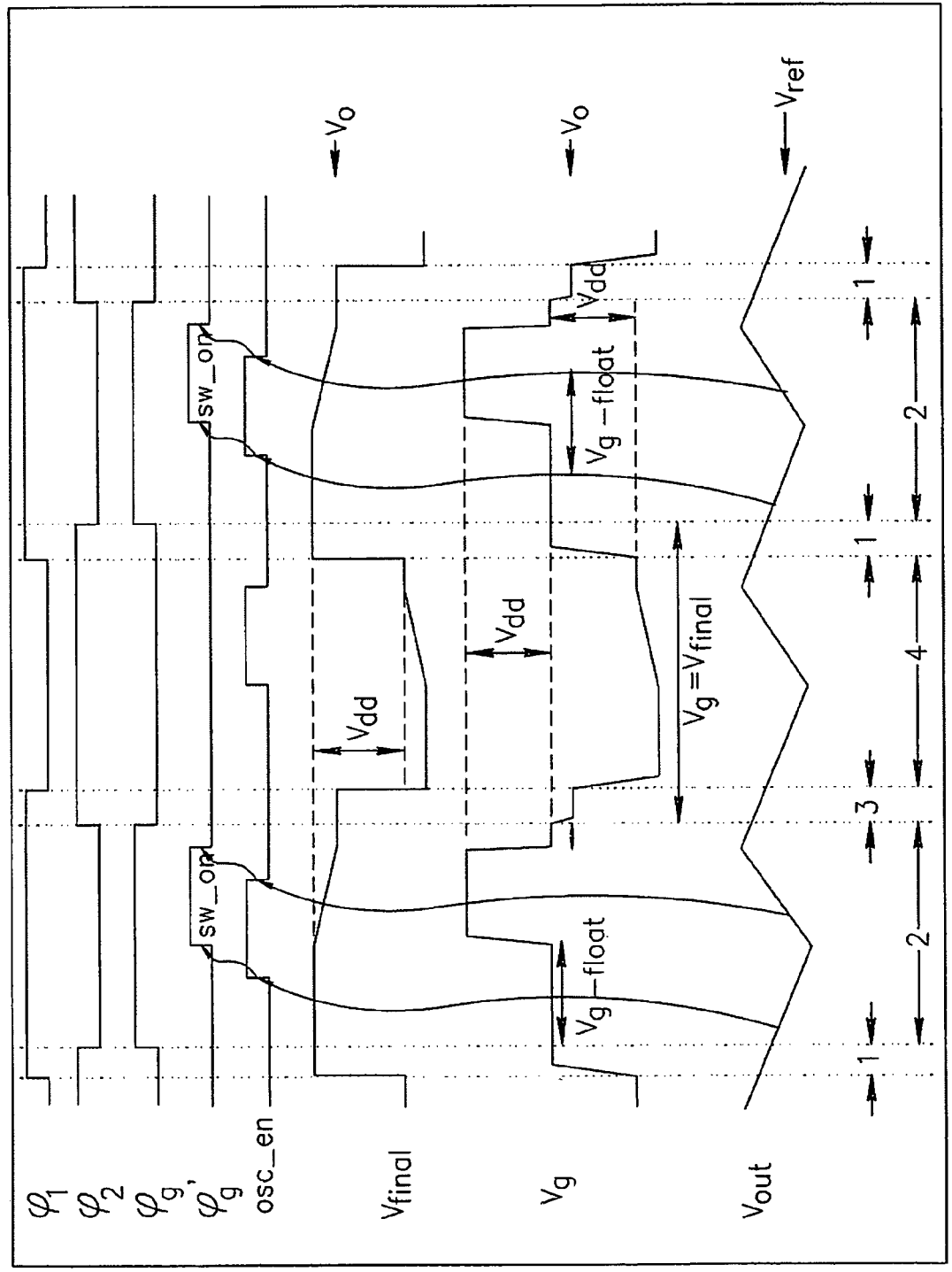
FIG. 5B is a timing diagram illustration of the operation of the switch stage of FIG. 3 in conjunction with a gate driver of FIG. 3.

It is noted that, in the embodiment of FIG. 3, switch stage 50 is not changed. Its standard operation will now be described, with reference to FIGS. 4 and 5A, after which, its operation in conjunction with enabled phase signal $\phi_g'$ will be described with reference to FIG. 5B. FIG. 4 is an exemplary circuit diagram illustration of switch stage 50. FIG. 5A is a timing diagram illustration of the operation of the various signals of switch stage 50 when operated in a standard fashion and FIG. 5B is a timing diagram illustration, similar to FIG. 5A, but including an exemplary enable signal osc_en and its effect on the other signals in switch stage 50.

In the example of FIG. 4, switch stage 50 may comprise a charge capacitor $C_{charge}$, a transfer capacitor $C_g$, two charging transistors 52 and 54 and a charge transfer transistor 56. The input to switch stage 50 may be $V_{final}$, the voltage on a capacitor $C_{final}$ and the final charge pump output, and the output of switch stage 50 may be provided to load capacitor $C_L$, as $V_{out}$. For FIG. 5A, the standard switch operation, the output signal is shown as $V_{out}'$ and for FIG. 5B, the inventive operation, it is shown as $V_{out}$. In switch stage 50, charge pump signal $V_{final}$ may be provided to transistors 52, 54 and 56, which are connected to each other and to capacitors $C_{charge}$ and $C_g$ in a bridge fashion.

FIG. 5A shows phase signals $\phi_1$, $\phi_2$ and $\phi_g$ and when they switch between a positive rail Vdd (i.e. 'high') and a negative rail 0 (i.e. 'low'). Between them, they create four phases. During phase 1, phases $\phi_1$ and $\phi_2$ are high but phase $\phi_g$ is low. Phase signal $\phi_1$ may boost the charge on final capacitor $C_{final}$ and phase signal $\phi_2$ may boost the charge on charge capacitor $C_{charge}$ from $V_{final}$ to $V_{final}$+Vdd. This high voltage may turn on transistor 54 thereby enabling voltage Vg, the voltage on transfer capacitor $C_g$ to follow final voltage $V_{final}$.

During phase 2, phase $\phi_1$ is high, phase $\phi_2$ is low and phase $\phi_g$ is high. With transfer capacitor $C_g$ at voltage $V_{final}$, the gates G of transistors 52 and 56, which may be connected to transfer capacitor $C_g$, may also be at voltage $V_{final}$ (i.e. they may be on). Transistor 54 may be off.

With phase $\phi_2$ low and phases $\phi_1$ and $\phi_g$ high, phase $\phi_1$ may discharge capacitor $C_{final}$ to transfer capacitor $C_{charge}$ through now open transistor 52 and, more importantly, to load capacitor $C_L$ through now open transistor 56. Standard output signal $V_{out}'$ may begin to rise, afterwards, it may drop as the load through load capacitor $C_L$ exceeds the voltage provided by $V_{final}$.

In phase 3, phases $\phi_1$ and $\phi_2$ are again high and phase $\phi_g$ is low. Voltage Vg again may follow final voltage $V_{final}$ and may drop its voltage to that of $V_{final}$.

In phase 4, phase $\phi_1$ may be low, phase $\phi_2$ may be high and phase $\phi_g$ may be low. Transistor 54 may be on, thereby enabling transfer capacitor $C_g$ to be charged from charge capacitor $C_{charge}$ and final capacitor $C_{final}$ may be charged from the previous phase.

It is noted that the timing diagram shows standard output signal $V_{out}'$ rising during phase 4, even though switch stage 50 is not transferring voltage to load capacitor $C_L$ during phase 4. This is due to the operation of a different switch stage 50 (from a bank of charge pump systems), presumably shifted in operation from the one of FIG. 4.

FIG. 5B shows the signals of FIG. 5A when gate driver 58 generates enabled phase signal $\phi_g'$. Phase signals $\phi_1$ and $\phi_2$ remain the same. However, as opposed to that shown in FIG. 5A, enabled phase signal $\Phi_g'$ is positive only when both enable signal osc_en and phase signal $\Phi_g$ are positive In FIG. 5B, enable signal osc_en is positive three times but enabled phase signal $\Phi_g'$ is positive only two of those times. The remaining time occurs during phase 4, when phase signal $\Phi_g$-' is negative. Thus, enable signal osc_en has no effect on this switch stage 50. However, since charge pumps are typically operated in banks of charge pump systems, enable signal osc_en presumably affects a different switch stage 50.

FIG. 5B shows the inventive output signal $V_{out}$ as falling during phase 1 and part of phase 2. When it reaches its lowest allowed value $V_{comp}$, measure circuit 20 (FIG. 1)

activates enable signal osc_en. During phase 1, phase signal $\Phi_g$ is supposed to be off and thus, switch stage 50 operates as in FIG. 5A. Phase signal $\Phi_1$ may boost the charge on final capacitor $C_{final}$ and phase signal $\phi_2$ may boost the charge on charge capacitor $C_{charge}$ from $V_{final}$ to $V_{final}+Vdd$. This high voltage may turn on transistor 54 thereby enabling voltage Vg, the voltage on transfer capacitor $C_g$ to follow final voltage $V_{final}$.

In phase 2, enable signal osc_en is still low and thus, enabled phase signal $\Phi_g'$ may not switch to its positive rail Vdd even though phase signal $\Phi_g$ may do so. Thus, there may be no boosting of the charge on transfer capacitor $C_g$ and there may be no corresponding high voltage to turn on transistors 52 and 56. Accordingly, there may not be any transferring of charge pump signal $V_{final}$ to load capacitor $C_L$. That is, until inventive output signal $V_{out}$ falls below its lowest allowed value $V_{comp}$. At that point, measure circuit 20 activates enable signal osc_en and, since this occurs during phase 2 when phase signal $\phi_g$ is still active, switch stage 50 may commence boosting the charge on transfer capacitor $C_g$, causing transistors 52 and 56 to turn on and thus, to transfer final signal $V_{final}$ to load capacitor $C_L$. Accordingly, $V_{out}$ increases once enable signal osc_en goes on.

Enable signal osc_en may go negative when output signal $V_{out}$ increases above its highest allowed value $V_{high}$. In FIG. 5B, this happens for the first time toward the end of phase 2. Phase signal $\phi_g'$ drops, voltage $V_g$ drops as well and, accordingly, no charge is transferred to load capacitor $C_L$. Output signal $V_{out}$ begins to decrease.

The process continues. Enable signal osc_en does not go on again until output signal $V_{out}$ drops below its lowest allowed value $V_{comp}$. However, this time, a different charge pump provides the charge since the one of FIG. 5B is in phase 4 when no charge can be transferred.

It is noted that the output signal $V_{out}$ of FIG. 5B has a smaller variation in value than the standard output signal $V_{out}'$. Moreover, the output signal $V_{out}$ does not exceed the maximum and minimum voltages as measured by measure circuit 20.

Figure 6:
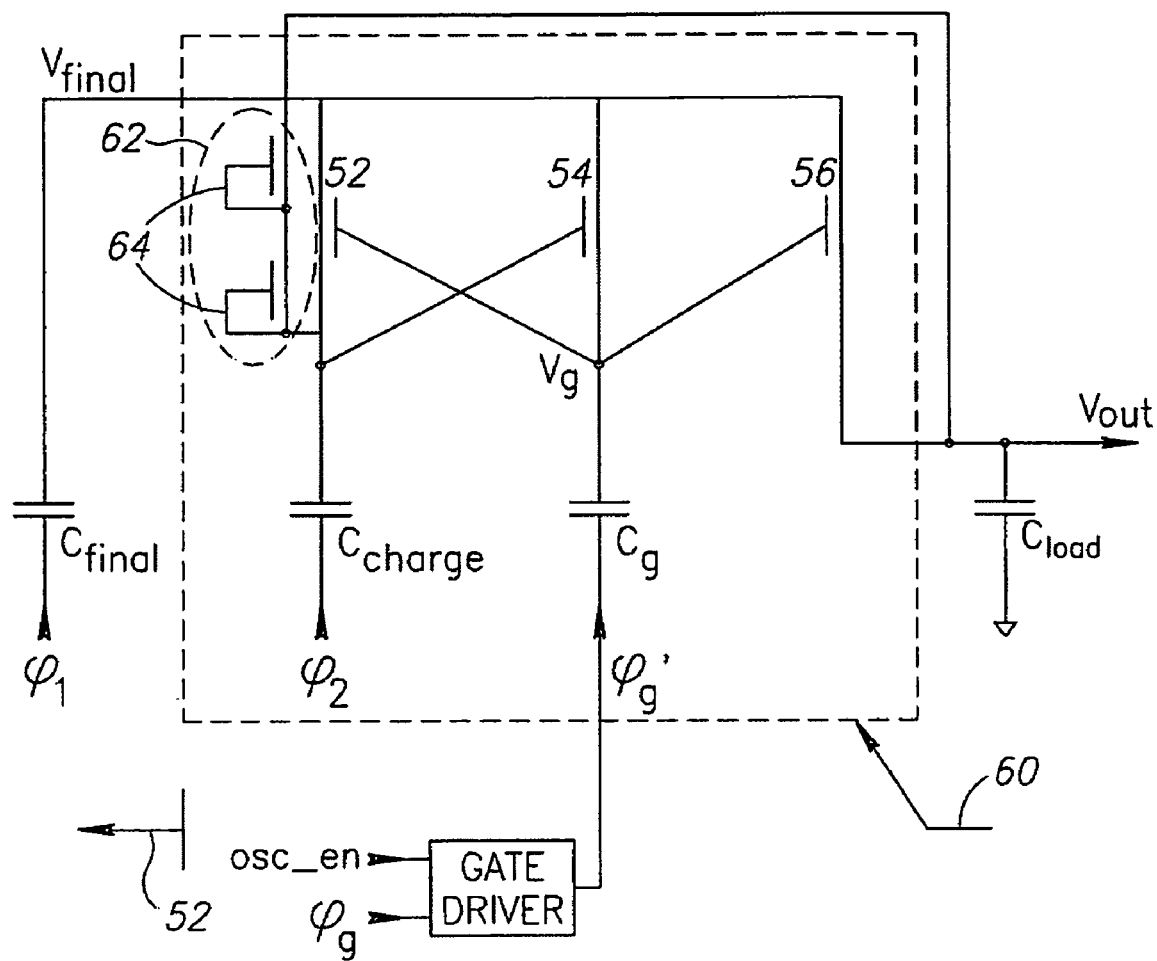
FIG. 6 is a circuit diagram illustration of a further embodiment of the switch stage of FIG. 3.

Reference is now made to FIG. 6, which illustrates a further embodiment of the inventive switch stage of the present invention. This embodiment, labeled 60, is similar to switch stage 50 with the addition of a clamp 62 connected between $V_{out}$ and charge capacitor $C_{charge}$. Similar reference numerals refer to similar elements of switch stage 50.

Clamp 62 may comprise two diodes 64 and may clamp the voltage rise of charge capacitor $C_{charge}$ (during phase 1, when phase signal $\phi_1$ may be at Vdd and enabled phase signal $\phi_g'$ may be at 0) to no higher than $V_{out}+2V_t$, where $V_t$ may be the threshold voltage level of diodes 64. This voltage rise may be less than the voltage rise in the previous embodiment and thus, may only partially open transistor 54, thereby reducing the voltage rise on transfer capacitor $C_T$ to $V_{out}+V_t$.

When enabled phase signal $\phi_g'$ may switch to its positive rail Vdd (during phase 2, if activated), it may boost the voltage on transfer capacitor $C_G$ from $V_{out}+V_t$ to $V_{out}+V_t+Vdd$. This medium level voltage may only partially turn on transistors 52 and 56, thereby transferring voltage $V_{out}+Vdd$ to load capacitor $C_L$ and raising $V_{out}$ by Vdd.

When enabled phase signal $\phi_g'$ may switch low (when deactivated or during phases 3, 4 and 1), the voltage on transfer capacitor $C_G$ may reduce to $V_{out}+V_t$, which may be insufficient to turn on transistors 52 and 56. Thus, the addition of clamp 62 may help ensure that no charge be transferred to load capacitor $C_L$. when oscillator enable osc_en may shut off oscillator 14.

Figure 7:
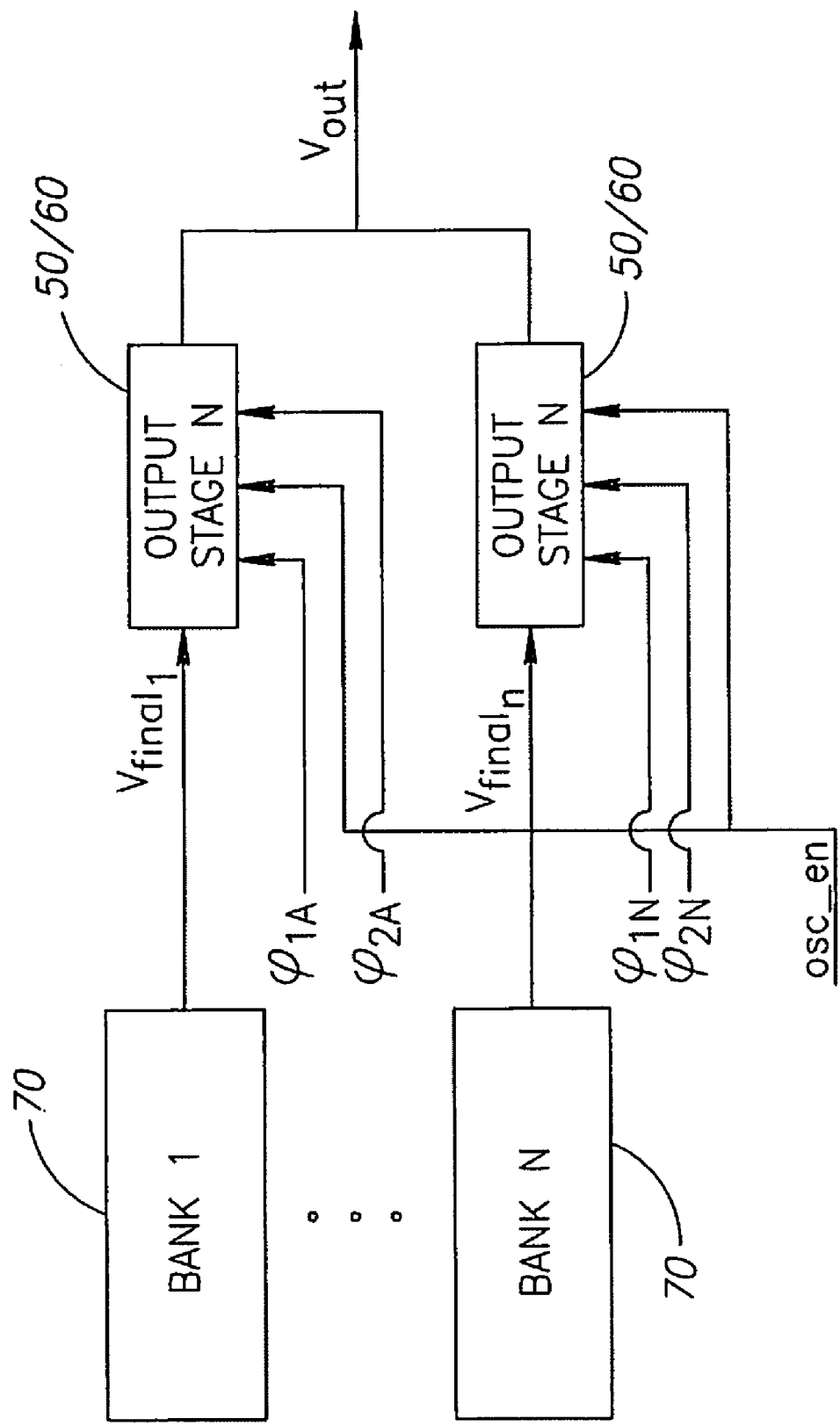
FIG. 7 is a schematic illustration of the present invention wherein the switch may be implemented for banks of charge pumps.

Reference is now made to FIG. 7, which illustrates a further embodiment of the present invention wherein switch 30 may be implemented for a set of banks 70 of charge pumps. The banks 70 may operate with the same frequency but with shifted phases, such that, when one bank 70 is charging, another bank generates output signal $V_{out}$. For each bank 70, there may be a switch stage 50 or 60 which may receive enable signal osc_en to produce enabled phase signals $\phi_g'$. In the embodiment of FIG. 7, the set of banks 70 may be shut off and turned on through switch stages 50/60.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A charge pump system comprising:
    a charge pump;
    an oscillator;
    a switching element to connect and disconnect said charge pump from a load capacitor wherein said switching element comprises:
        a switch stage of said charge pump, said switch stage receiving a phase signal; and
        a gate driver providing said phase signal as a function of the output of said enable signal generator and of at least one phase signal generated from the output of said oscillator; and
    an enable signal generator connected to said oscillator and to said switching element to enable and disable said oscillator and said switching element as a function of the output of said charge pump.

2. The system according to claim 1 and wherein said switching element comprises a transistor.

3. The system according to claim 1, wherein said at least one phase signal is a phase signal controlling a transfer transistor of said switch stage.

4. The system according to claim 1, also comprising a clamp to clamp a voltage of said switch stage to the voltage level of an output of said switch stage.

5. A method comprising:
    controlling the connection of a charge pump output to a load capacitor as a function of activation control signals from an oscillator controlling said charge pump, wherein said controlling comprises:
    providing an enabled phase signal formed by ANDing an oscillator enable signal with one of the activation control signals; and
    phase signal to control a switch stage of said charge pump.

6. The method according to claim 5, wherein said enabled phase signal controls a transfer of charge from said charge pump to a load capacitor.

7. The method according to claim 5, also comprising clamping a voltage of said switch stage to the voltage level of an output of said switch stage.

* * * * *